US006586743B1

(12) United States Patent
Overdick et al.

(10) Patent No.: US 6,586,743 B1
(45) Date of Patent: Jul. 1, 2003

(54) X-RAY DETECTOR HAVING SENSORS AND EVALUATION UNITS

(75) Inventors: Michael Overdick, Langerwehe (DE); Josef Lauter, Geilenkirchen (DE); Walter Rütten, Linnich (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/856,770

(22) PCT Filed: Sep. 20, 2000

(86) PCT No.: PCT/EP99/09202

§ 371 (c)(1),
(2), (4) Date: May 24, 2001

(87) PCT Pub. No.: WO01/23909

PCT Pub. Date: Apr. 5, 2001

(30) Foreign Application Priority Data

Sep. 24, 1999 (DE) .......................................... 199 45 757

(51) Int. Cl.⁷ ................................................. G01T 1/16
(52) U.S. Cl. ............................. 250/370.11; 250/370.01; 250/370.14; 250/206.1; 250/214 R
(58) Field of Search ................................. 250/370, 206, 250/206.1, 206.2, 206.3, 214

(56) References Cited

U.S. PATENT DOCUMENTS 3,984,690 A  * 10/1976 Marshall et al. ............. 250/374
5,602,468 A     2/1997 Harrington
5,729,021 A  *  3/1998 Brauers et al. ......... 250/370.09

FOREIGN PATENT DOCUMENTS

DE   197 03 428   8/1998
DE   19703428     8/1998   ......... G01N/23/083
EP   0 715 830    6/1996

OTHER PUBLICATIONS

Fisher P. et al, "A counting pixel readout chip for imaging applications" Nuclear Instruments & Methods In Physics Research, Section –A: Accelerators, Spectrometers, Detectors And Associated Equipment, NL, North–Holland Publishing Company, Amsterdam, vol. 405, No. 1, Mar. 1, 1998, pp. 53–59, XP004110405 ISSN: –168–9002.*

* cited by examiner

Primary Examiner—Constantine Hannaher
Assistant Examiner—Timothy Moran
(74) Attorney, Agent, or Firm—John Vodopia

(57) ABSTRACT

An X-ray detector includes an array of X-ray sensitive sensors, each sensor including a conversion element which converts incident X-rays into electric charge pulses. The X-ray detector also includes an evaluation unit which is electrically connected to the conversion element in order to receive and evaluate the electric charge pulses. In order to form an X-ray detector which exhibits a high degree of linearity over a large dynamic range in conjunction with a higher maximum count rate and in order to avoid falsification of the calculated image by multiple counting of X-ray quanta, the evaluation unit includes a current/frequency converter as well as an electronic counter which is electrically connected thereto. The electric charge pulses from the conversion element are applied to the input of the current/frequency converter whose output pulses are applied to the electronic counter.

18 Claims, 1 Drawing Sheet

X-RAY DETECTOR HAVING SENSORS AND EVALUATION UNITS

FIELD OF THE INVENTION

The invention relates to an X-ray detector which includes an array of X-ray sensitive sensors, each sensor including a conversion element which converts incident X-rays into electric charge pulses and an evaluation unit which is electrically connected to the conversion element in order to receive and evaluate the electric charge pulses.

BACKGROUND OF THE INVENTION

X-ray detectors provided with an array of X-ray sensitive sensors are used notably in the field of medical diagnosis. In a conventional computed tomography (CT) apparatus the patient is irradiated from different directions, in a plane extending perpendicularly to the body axis of the patient, by means of a rotating arrangement of an X-ray tube and a row of sensors. A data set is acquired for each projection, the two-dimensional cross-sectional image ultimately being calculated from the data sets of all projections. Also known are more sophisticated computed tomography apparatus provided with a so-called sensor matrix in which the sensors are arranged in rows and columns. Finally, X-ray detectors of this kind can be used for industrial applications and for security applications, for example for luggage inspection.

Directly converting conversion elements or conversion elements consisting of a scintillator in conjunction with a photodiode are suitable for the conversion of the incident X-rays into electric charge pulses. The directly converting sensors feature simplicity of construction and at the same time a high spatial resolution. They consist of heavy and suitably absorbing semiconductor materials such as, for example, CdZnTe or PbO. In the case of scintillators in conjunction with photodiodes the light-emitting properties of the scintillator are used to convert the X-rays first into low-energy, notably visible radiation which subsequently produces charge pulses in the photodiode.

Either so-called integrating sensors or so-called counting sensors are used for such X-ray detectors. The evaluation units of the integrating sensors integrate the charge pulses from the conversion element over a defined integration time (frame time). The amount of charge integrated at the end of the integration time constitutes a measure of the energy deposited in the conversion element by the X-ray quanta. The counting sensors count each X-ray quantum absorbed in the conversion element individually, irrespective of the energy contained in each X-ray quantum. To this end, at regular intervals each charge pulse generated in the conversion element is converted, by means of a signal forming amplifier and a comparator, into a digital pulse which is counted by an electronic counter. The count at the end of a counting period (frame time) constitutes a measure of the number of X-ray quanta absorbed in the conversion element during the counting period.

For example, DE 197 03 428 A1 discloses an X-ray detector with sensors which are arranged in rows or in a matrix and can individually and hence digitally detect the incident X-ray quanta. Each sensor includes a conversion element which can be individually read out. To this end, the conversion element is capacitively coupled to a preamplifier whose output is connected to an evaluation unit. The latter unit includes at least one integrator and one counter which counts the charge pulses supplied by the output of the integrator. The evaluation unit also includes a digital storage device in which the number of charge pulses counted is stored for each detector element.

The known X-ray detectors with counting sensors have the drawback that the count rate is limited by dead time effects of the preamplifier, other parts of the evaluation unit (for example, the comparator) or the conversion element. Therefore, it must be ensured that the X-ray quantum flow of the X-rays to be expected for each of the conversion elements is less than the maximum count rate at which the relevant sensor can still individually detect the X-ray quanta. To this end, in conformity with DE 197 03 428 A1 the surface area of each individual detector element must be chosen to be so small that the quantum flow is less than the maximum count rate. Finally, crosstalk occurs between neighboring conversion elements in the known X-ray detectors. Consequently, it may occur that an X-ray quantum is counted in several sensors so that the result is falsified. It is to be noted that X-ray detectors provided with counting sensors offer the advantage of a large dynamic range in conjunction with excellent linearity of the evaluation unit over the entire dynamic range.

SUMMARY OF THE INVENTION

Based on this state of the art, it is an object of the invention to provide an X-ray detector of the kind set forth which has a high maximum count rate in combination with a high degree of linearity over a large dynamic range and in which falsification of the calculated image by multiple counting of X-ray quanta is avoided.

This object is achieved on the basis of the idea to count the sum of the amounts of charge Q contained in the charge pulses in units of a fixed amount of charge $Q_1$, that is, exactly one output pulse is produced for each fixed amount of charge $Q_1$, instead of counting each charge pulse generated by an individual X-ray quantum in the conversion element individually, irrespective of its amount of charge.

More specifically, this object is achieved in that the evaluation unit includes a current/frequency converter as well as an electronic counter which is electrically connected thereto, the electric charge pulses being applied from the conversion element to the input of the current/frequency converter whose output pulses are applied to the electronic counter. The conversion of analog measured quantities into frequency-modulated signals is known from the signal transmission technique, notably the physical measuring technique, and is applied when a high immunity against interference during the transmission of the signal is desired A conversion of analog measured quantities, in this case the electric charge pulses, into a frequency-modulated signal is now performed for the first time for a completely different purpose, that is, the elimination of the drawbacks of the known X-ray detectors provided with counting sensors.

Because the individual charge pulses are no longer counted in the device according to the invention, the dead times usually occurring due to preamplifiers and/or pulse-shaping amplifiers in the case of single pulse evaluation are now absent. The invention enables operation of the X-ray detector up to high count rates without restricting the linearity or the magnitude of the dynamic range.

Moreover, multiple counting of X-ray quanta is avoided in a device according to the invention. Admittedly, an X-ray quantum can still generate a charge pulse in neighboring conversion elements as before. However, these charge pulses no longer have a falsifying effect on the count at the end of a counting period, because each amount of charge Q from a conversion element generates a digital pulse only when the amounts of charge Q yield a fixed amount of charge $Q_1$. Therefore, when the charge pulse generated by an X-ray quantum is distributed between neighboring conversion elements, the current/frequency converters of neighboring sensors receive a smaller amount of charge, so that the amount of charge $Q_1$ required in each sensor so as to generate the count pulse is reached only later.

Because of their compact and simple construction, direct converting conversion elements, for example, of CdTe, CdZnTe, GaAs, $HgI_2$, PbI, PbO, TiBr, InSb, Si, Ge or Se can be used for advantageous embodiments of the invention. Some of said materials produce charge pulses which are comparatively extensive in time. Therefore, in conversion elements containing these materials frequently overlapping of successive charge pulses occurs in the case of strong X-ray irradiation. Whereas such overlap leads to loss of counting results in conventional counting sensors, all charge pulses and their associated amounts of charge Q are correctly detected in a device according to the invention.

The current/frequency converter and/or the counter comprises a reset input in a further embodiment of the invention. The reset input of the current/frequency converter ensures that a residual charge from the preceding counting period will not influence the measurement during the subsequent counting period.

When the counters are constructed as feedback shift registers, a high integration density can be achieved because of the compact construction; such a density is required notably in the case of X-ray detectors provided with sensors arranged in a matrix. For feedback shift registers reference is made to P. Fischer et al., "A counting pixel read-out chip for imaging applications", Nucl. Instr. and Meth. A405 (1998), pp. 53–59.

The conversion elements may have a discrete construction, but are preferably constructed as part of an integrated circuit which includes at least the associated evaluation units of the sensors. A complete matrix of sensors may be composed of one or more of such integrated circuits. (Examples: Si-Pin diode integrated in a silicon integrated circuit; GaAs conversion element integrated in a GaAs integrated circuit; CdZnTe conversion elements integrated in a silicon integrated circuit).

In order to compensate the dark current of the X-ray detector, an additional adjustable current source is connected to the input of each current/frequency converter in an advantageous embodiment of the invention.

BRIEF DESCRIPTION OF THE DRAWINGS

The invention will be described in detail hereinafter with reference to the Figures.

DETAILED DESCRIPTION OF THE PREFERRED EMBODIMENTS

Figure 1:
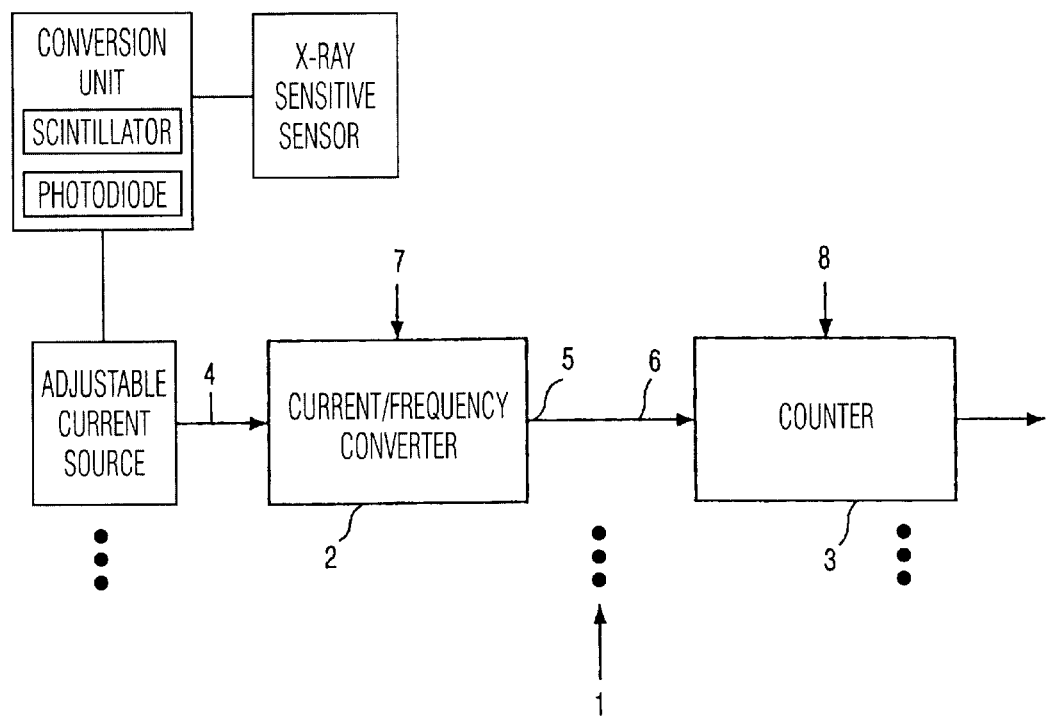
FIG. 1 shows a block diagram of an evaluation unit of an X-ray detector according to the invention.

The evaluation unit 1 includes a current/frequency converter 2 as well as a counter 3. The electric charge pulses from the conversion element are applied to an input 4 of the current/frequency converter 2 which produces a digital pulse after a defined charge $Q_1$ has been applied via the input 4. The digital pulse train of the current/frequency converter 2 is transferred, via an electrical connection 6, from an output 5 of the current/frequency converter 2 to the counter 3. The contents of the counter 3 can be applied to downstream circuits, for example, via a serial or a parallel digital interface. The current/frequency converter 2 and the counter 3 are provided with reset inputs 7 and 8 for the purpose of resetting.

Figure 2:
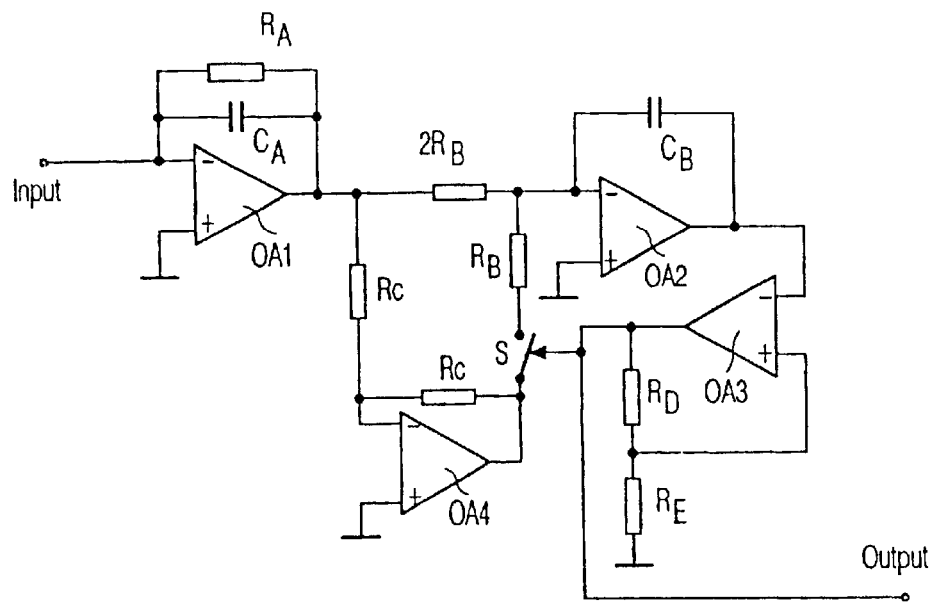
FIG. 2 shows a feasible circuit arrangement of a current/frequency converter of the evaluation unit shown in FIG. 1.

In the general circuit diagram of a feasible current/frequency converter 2 as shown in FIG. 2 use is made of symbols of operational amplifiers, resistors, capacitances and switches so as to illustrate the functions. In practice, however, these components are integrated, for example in CMOS technology. The current/frequency converter, denoted overall by the reference numeral 2, consists of a first stage which consists of the operational amplifier OA1. This first stage represents an integrator with a built-in discharge resistor $R_A$.

The second stage of the current/frequency converter consists of the operational amplifiers OA2, OA3 and OA4 whose circuit diagram is as shown in FIG. 2 and will be described in detail hereinafter. The integration direction of the integrating operational amplifier OA2 with the capacitance $C_B$ is controlled by a Schmitt trigger which is composed of the operational amplifier OA3 and the resistors $R_D$ and $R_E$. While the output voltage of the operational amplifier OA3 is positive, the switch S is closed so that the integration direction of the OA2 is reversed, via the operational amplifier OA4 which is connected as a voltage inverter and includes the two resistances $R_C$, in comparison with the integration direction in the case of an open switch S. Similar circuit arrangements for voltage/frequency converters (second stage) are known from the state of the art (for example, see P. Horowitz and W. Hill "The art of electronics", Cambridge University Press, $2^{nd}$ edition 1989).

For an instantaneous charge pulse Qm at the instant t=0 on the input 4 of the evaluation unit the output voltage on the output of the operational amplifier OA1 amounts to $U_{aus}=(Qm/C_A)e^{-t/\tau}$ with the characteristic time constant $\tau=R_A C_A$.

More generally speaking, every electric charge pulse with an amount of charge Q and of arbitrary shape is converted into a voltage variation by the operational amplifier OA1. The integral over this voltage variation is proportional to the amount of charge Q of the electric charge pulse. It is important that the time constant $\tau$, defined by the resistance $R_A$ and the capacitance $C_A$, is selected so as to be substantially smaller than the counting period (frame time). Otherwise charge pulses of one counting period could falsify the count of the subsequent counting period.

In accordance with the invention the current/frequency converter 2 generates a digital pulse only if the amount of the charges Q of the electric charge pulses present on the input 4 yield a previously defined charge value $Q_1$ which corresponds exactly to a digital pulse on the output of the current/frequency converter 2.

For the circuit arrangement shown in FIG. 2 this charge $Q_1$ is calculated in conformity with the following formula $Q_1=8U_T C_B R_B/R_A$, where $U_T=U_{max}R_E/(R_D+R_E)$ denotes the switching threshold of the Schmitt trigger. For this calculation symmetrical output voltages of $+/-U_{max}$ were assumed for OA3.

What is claimed is:

1. An X-ray detector comprising an array of X-ray sensitive sensors, each sensor including a conversion element which converts incident X-rays into electric charge pulses and an evaluation unit which is electrically connected to the conversion element in order to receive and evaluate the electric charge pulses, wherein the evaluation unit includes a current/frequency converter as well as an electronic counter which is electrically connected thereto, the electric charge pulses being applied from the conversion element to the output of the current/frequency converter whose output pulses are applied to the electronic counter.

2. An X-ray detector as claimed in claim 1, further comprising a directly converting conversion element.

3. An X-ray detector as claimed in claim 1, further comprising a conversion element consisting of a scintillator in conjunction with a photodiode.

4. An X-ray detector as claimed in one of the claims 1 to 3, wherein the current/frequency converter and/or the counter includes a reset input.

5. An X-ray detector as claimed in one of the claims 1 to 3, wherein the electronic counter is constructed as a feedback shift register.

6. An X ray detector as claimed in one of the claims 1 to 3, wherein a plurality of conversion elements and associated evaluation units form part of at least one integrated circuit.

7. An X-ray detector as claimed in one of the claims 1 to 3, wherein an additional adjustable current source is connected to the input of each current/frequency converter.

8. The use of an X-ray detector as claimed in one of the claims 1 to 3 in an X-ray diagnostic apparatus, notably a computed tomography apparatus.

9. An X-ray detector as claimed in claim 4, wherein the electronic counter is constructed as a feedback shift register.

10. An X-ray detector as claimed in claim 4, wherein a plurality of conversion elements and associated evaluation units form part of at least one integrated circuit.

11. An X-ray detector, as claimed in claim 4, wherein an additional adjustable current source is connected to the input of each current/frequency converter.

12. The use of an X-ray detector as claimed in claim 4 in an X-ray diagnostic apparatus, notably a computer tomography apparatus.

13. An X-ray detector as claimed in claim 5, wherein a plurality of conversion elements and associated evaluation units form part of at least one integrated circuit.

14. An X-ray detector as claimed in claim 5, wherein an additional adjustable current source is connected to the input of each current/frequency converter.

15. The use of an X-ray detector as claimed in claim 5 in an X-ray diagnostic apparatus, notably a computer tomography apparatus.

16. An X-ray detector as claimed in claim 6, wherein an additional adjustable current source is connected to the input of each current/frequency converter.

17. The use of an X-ray detector as claimed in claim 6 in an X-ray diagnostic apparatus, notably a computer tomography apparatus.

18. The use of an X-ray detector as claimed in claim 7 in an X-ray diagnostic apparatus, notably a computer tomography apparatus.

* * * * *